April 23, 1940.   E. V. BERRY   2,198,074
METHOD OF MAKING BEARINGS
Filed Feb. 6, 1939
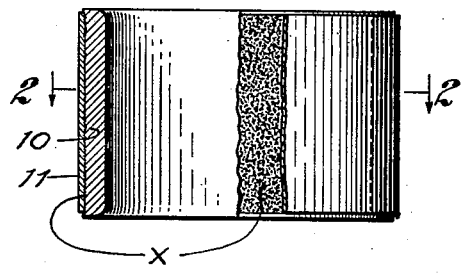
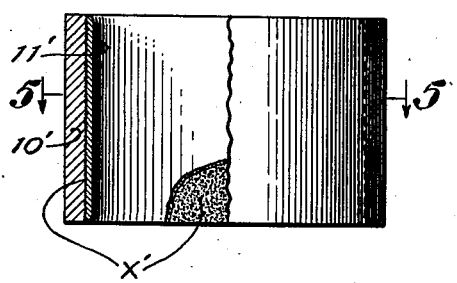
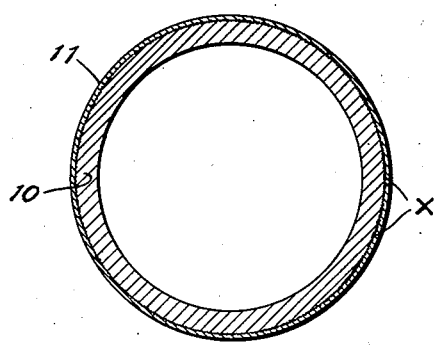
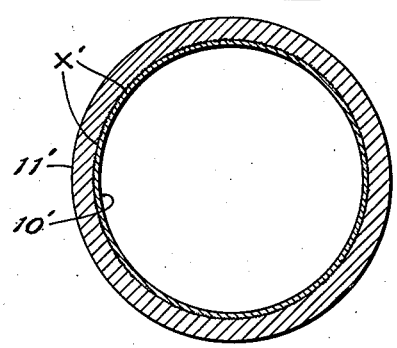
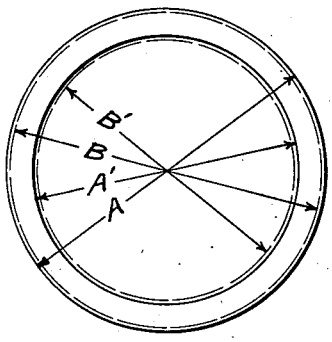
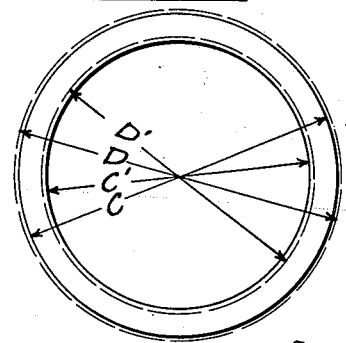
Inventor.
ERNEST V. BERRY
By 
Attorney Patented Apr. 23, 1940

2,198,074

UNITED STATES PATENT OFFICE 2,198,074

METHOD OF MAKING BEARINGS

Ernest V. Berry, Los Angeles, Calif.

Application February 6, 1939, Serial No. 254,755

2 Claims. (Cl. 29—149.5)

The hereinafter described invention relates to an improvement in preformed bearings of the class which includes bushings, sleeves and the like as used in engines and machines; my invention being particularly applicable to such bearings in the re-establishment of their surfaces to workable sizes after they are rendered unfit for use.

My invention relates more particularly to bearings of the shell and/or cylindrical type where the bearing has become impaired through service and considered as scrap metal in most cases, the object of my invention being to reclaim such bearings and render them equal to, and in many cases superior to new bearings; thereby providing a new article of manufacture from a discarded part, which will extend the utility of the original bearing at a nominal cost.

My invention contemplates the working of the parent metal of the worn or discarded bearing and the addition of metal bonded to the parent metal to re-establish the same to specific sizes.

In order that my improvements may be fully understood, I will describe at least one manner in which I carry out the process of my invention, including resultant parts produced thereby.

In the illustrative embodiments, Fig. 1 is a broken sectional elevation of a typical bearing as formed by my process. Fig. 2 is a sectional plan view taken on line 2—2, Fig. 1. Fig. 3 is a diagrammatical plan view in which the solid lines show the parent metal of the bearing of Fig. 1 before working by my process and the broken lines the parent metal of the bearing after working and prior to the final re-establishment of its sizes. Fig. 4 is a broken sectional elevation of another bearing of my invention in which the metal as applied to the parent metal of the bearing is made on the inner surface thereof as distinguished from the bearing of Fig. 1 in which the metal applied to the parent metal is made on the outer surface of the bearing. Fig. 5 is a sectional plan view taken on line 5—5, Fig. 4. Fig. 6 is a diagrammatical plan view similar to that of Fig. 3, solid lines showing the parent metal of the bearing of Fig. 4 before treatment by my process and the broken lines showing the parent metal after treatment and prior to application of metal thereto.

In the drawing, Figs. 1 and 2, the parent metal of the bearing after treatment is denoted by numeral 10. In this instance the bearing is a cylindrical sleeve as used in the end of the connecting rod of an internal combustion engine for the wrist pin thereof. As shown in Fig. 3 the original sleeve dimensions as denoted by diameters A and A' have been subjected to a pressing operation, the ductility of the metal permitting the sleeve to be squeezed or compressed to the dimensions denoted by diameters B and B'. Any power press of proper size with suitable dies may be employed in this operation, and on small diameter sleeves an arbor press may be used. The mechanism for carrying out the pressing operation is such as to cause the movement of the parent metal 10 of the bearing into its new sizes. After transformation of the parent metal of the sleeve of Figs. 1, 2 and 3 into its new sizes, application of metal as denoted by numeral 11 is made to its exterior surface in order to re-establish its original size, in the case of the present described sleeve, to fit the bore in the connecting rod.

In applying the new metal to the processed parent metal as denoted by numeral 11, I may employ any number of available ways to bond the same thereto; however, I have discovered at this time, at least, one preferable way of carrying this out, namely, by the application of sprayed molten metal with a metal spray gun—this being shown in Figs. 1 and 2, and the bond between the parent metal of the sleeve 10 and the deposited metal 11, being denoted at X. As shown the bond X, is made by sand or steel grit blasting, although any surface preparation for adequately retaining the sprayed molten metal to the part may be employed by me. I preferably use the metal spray process in applying the building up metal 11, as it offers the advantage in permitting application of a ferrous metal to a sleeve of non-ferrous parent metal; and in view of the fact that sprayed molten metal is cast metal as deposited, it will be clear that a cast iron surface results. Application of a rustless cast iron is desirable and by reason of being cast is particularly well adapted to compression when forced into the connecting rod bore, creating in effect a substantial backing for the more ductile non-ferrous metal of the sleeve which materially aids in preventing the loosening of the sleeve in place and better maintains the parent metal of the sleeve in service against the pounding action of the wrist pin.

Having applied the new metal 11 to parent metal 10, the sleeve is finished on its outer and inner surfaces to fit the connecting rod bore and wrist pin respectively.

Now referring to Figs. 4, 5 and 6. In the process of reclamation of the sleeve as shown, the parent metal thereof, per Fig. 6, is brought from the sizes as denoted by diameters C and C', to the diameters denoted by D and D'. Transformation of the parent metal is made in a suitable press and dies, with allowance in diameter D for finishing the outer surface of the parent metal to fit the bore of the bearing housing. Sprayed molten metal as denoted at 11' has been applied in the present instance over the inner surface of the parent metal 10' to build up a metal thickness sufficient, after finishing, to re-establish the fit between the sleeve and the journal for which it is intended.

The application of sprayed molten metal 11', with typical grit blasted bond, X', in the instance of this bearing sleeve has the advantage, due to its cast structure and porosity, of retaining lubricant between the journal and sleeve surfaces and reducing the wear of their frictional engagement.

It will be clear that the process of my invention provides a new article of manufacture made from the stock of a bearing, unfit for use through loss of its working fits.

I claim:

1. The method of producing a bearing sleeve for a machine element which consists in utilizing the metal of a previously formed sleeve, reconstructing said sleeve by subjecting it to force in a machine so as to uniformly move the metal structure thereof into surfaces with new dimensions while substantially maintaining the original wall thickness, applying a coating of metal to one of the newly created wall surfaces and finishing said coating and the other newly created wall surface to fit the element journal and sleeve holder.

2. The method of producing a bearing sleeve for a machine element which consists in utilizing the metal of a previously formed sleeve, reconstructing the sleeve wall by substantially uniformly moving the metal structure thereof in a manner to simultaneously form wall surfaces with new dimensions, applying a coating of metal on one of the newly created wall surfaces to build it up, and finishing the surfaces of the reconstructed sleeve to fit the element journal and the sleeve holder.

ERNEST V. BERRY.